(12) United States Patent
Sassman (10) Patent No.: US 9,353,982 B2
(45) Date of Patent: May 31, 2016

(54) PORTABLE FOOD AND BEVERAGE STORAGE AND DISPENSING COOLER

(71) Applicant: Jeff Sassman, Garden Grove, CA (US)

(72) Inventor: Jeff Sassman, Garden Grove, CA (US)

(*) Notice: Subject to any disclaimer, the term of this patent is extended or adjusted under 35 U.S.C. 154(b) by 0 days.

(21) Appl. No.: 14/830,830

(22) Filed: Aug. 20, 2015

(65) Prior Publication Data
US 2016/0054045 A1      Feb. 25, 2016

Related U.S. Application Data

(60) Provisional application No. 62/040,199, filed on Aug. 21, 2014.

(51) Int. Cl.
| | | |
|---|---|---|
| B65D 81/38 | (2006.01) | |
| B62B 1/10 | (2006.01) | |
| A45C 11/20 | (2006.01) | |
| F25D 3/08 | (2006.01) | |
| B65D 25/28 | (2006.01) | |
| B65D 25/04 | (2006.01) | |
| B65D 25/42 | (2006.01) | |
| B65D 43/14 | (2006.01) | |
| B65D 25/24 | (2006.01) | |
| B62B 1/16 | (2006.01) | |
| B62B 1/00 | (2006.01) | |

(52) U.S. Cl.
CPC . *F25D 3/08* (2013.01); *A45C 11/20* (2013.01); *B62B 1/008* (2013.01); *B62B 1/10* (2013.01); *B62B 1/16* (2013.01); *B65D 25/04* (2013.01); *B65D 25/24* (2013.01); *B65D 25/28* (2013.01); *B65D 25/42* (2013.01); *B65D 43/14* (2013.01); *B65D 81/38* (2013.01); *B65D 81/3802* (2013.01); *B65D 81/3806* (2013.01); *B65D 2525/286* (2013.01)

(58) Field of Classification Search
CPC ............ B62B 1/00; B62B 1/008; B62B 1/02; B62B 1/047; B62B 1/10; B62B 1/125; B62B 1/26; B62B 5/061; B62B 5/067; B62B 2204/00; B62B 2204/06; B62B 2202/02; B62B 2202/023; B62B 2202/52; B65D 81/3802; B65D 81/3806; A45C 11/20
See application file for complete search history.

(56) References Cited

U.S. PATENT DOCUMENTS

| | | | | |
|---|---|---|---|---|
| 2,161,295 A | * | 6/1939 | Hirschberg | B65D 81/3834 220/23.87 |
| 2,724,494 A | * | 11/1955 | Graff | A45C 11/20 206/545 |
| 3,613,872 A | * | 10/1971 | Donnelly | A45C 11/20 206/545 |
| 4,172,365 A | * | 10/1979 | McClintock | A45C 5/141 280/47.31 |
| 4,280,336 A | * | 7/1981 | Taylor | A45C 11/20 206/541 |
| 5,277,328 A | * | 1/1994 | Tocco | A45C 11/20 206/315.3 |
| 6,047,866 A | * | 4/2000 | Brown | B05B 9/007 222/481 |

(Continued)

*Primary Examiner* — Frank Vanaman (57) ABSTRACT

A portable food and beverage storage and dispensing cooler is designed to keep liquids and dry items cool and separated. Liquids and beverage containers such as cans and bottles are stored within an insulated tubular body. Beverage containers may be placed into a plurality of beverage-storage units that may be mounted into a plurality of beverage slots on the insulated tubular body. An annular divider is positioned within the insulated tubular body to form a central compartment for liquids as well as a ring-like compartment for ice. The ice is positioned in a manner to cool liquids and items within both the central compartment and the ring-like compartment. An at least one insulated lid is able to cover the contents within the insulated tubular body. A pull handle, a left wheel, and a right wheel allow the cooler to be pulled along a surface for transportation.

17 Claims, 11 Drawing Sheets

(56) References Cited

U.S. PATENT DOCUMENTS

| | | | |
|---|---|---|---|
| 6,076,298 A * | 6/2000 | Teel | A01K 97/22 43/54.1 |
| 6,755,428 B2 * | 6/2004 | Butler | A45C 9/00 224/547 |
| 7,284,393 B1 * | 10/2007 | Macmillan | B62B 1/22 62/331 |

* cited by examiner

SECTION B-B

PORTABLE FOOD AND BEVERAGE STORAGE AND DISPENSING COOLER

The current application claims a priority to the U.S. Provisional Patent application Ser. No. 62/040,199 filed on Aug. 21, 2014.

FIELD OF THE INVENTION

The present invention relates generally to a cooler for food and beverage. More specifically, the present invention is a food and beverage storage and dispensing cooler for cooling food and beverage items while keeping liquid contents separated from dry items.

BACKGROUND OF THE INVENTION

The most common means of keeping food and beverage items cold when not in a refrigerator is by placing the food and beverage items into a cooler. Coolers are containers that are capable of storing and transporting food and beverage items along with ice in order to keep the contents cold. A typical cooler comprises a hard outer shell and a hard inner shell with an insulating material such as hard foam positioned in between. This allows water from melting ice to be contained within the cooler. In addition to simply keeping items cool, various types of coolers are able to directly dispense liquids contained within the coolers. Liquids are generally poured directly into these types of coolers and are dispensed through a spout or similar device that allows the user to regulate the flowrate of the liquid as the liquid leaves the cooler. A common drawback of coolers is the fact that there is generally no organizational capacity. Most coolers typically only feature a single compartment into which all items to be cooled are placed along with ice. As a result, oftentimes a cooler cannot be used to store both liquids to be dispensed and dry items such as cans and bottles.

The present invention is a food and beverage storage and dispensing cooler. The present invention allows the user to store and cool both liquids and dry items while ensuring that the liquids and dry items are separated. The present invention is additionally able to hold and separate ice from the liquids and dry items. Liquids may be dispensed directly from the present invention as well. The present invention is designed to provide organization to food and beverage items while remaining portable and convenient to use.

DETAIL DESCRIPTIONS OF THE INVENTION

All illustrations of the drawings are for the purpose of describing selected versions of the present invention and are not intended to limit the scope of the present invention.

Figure 1:
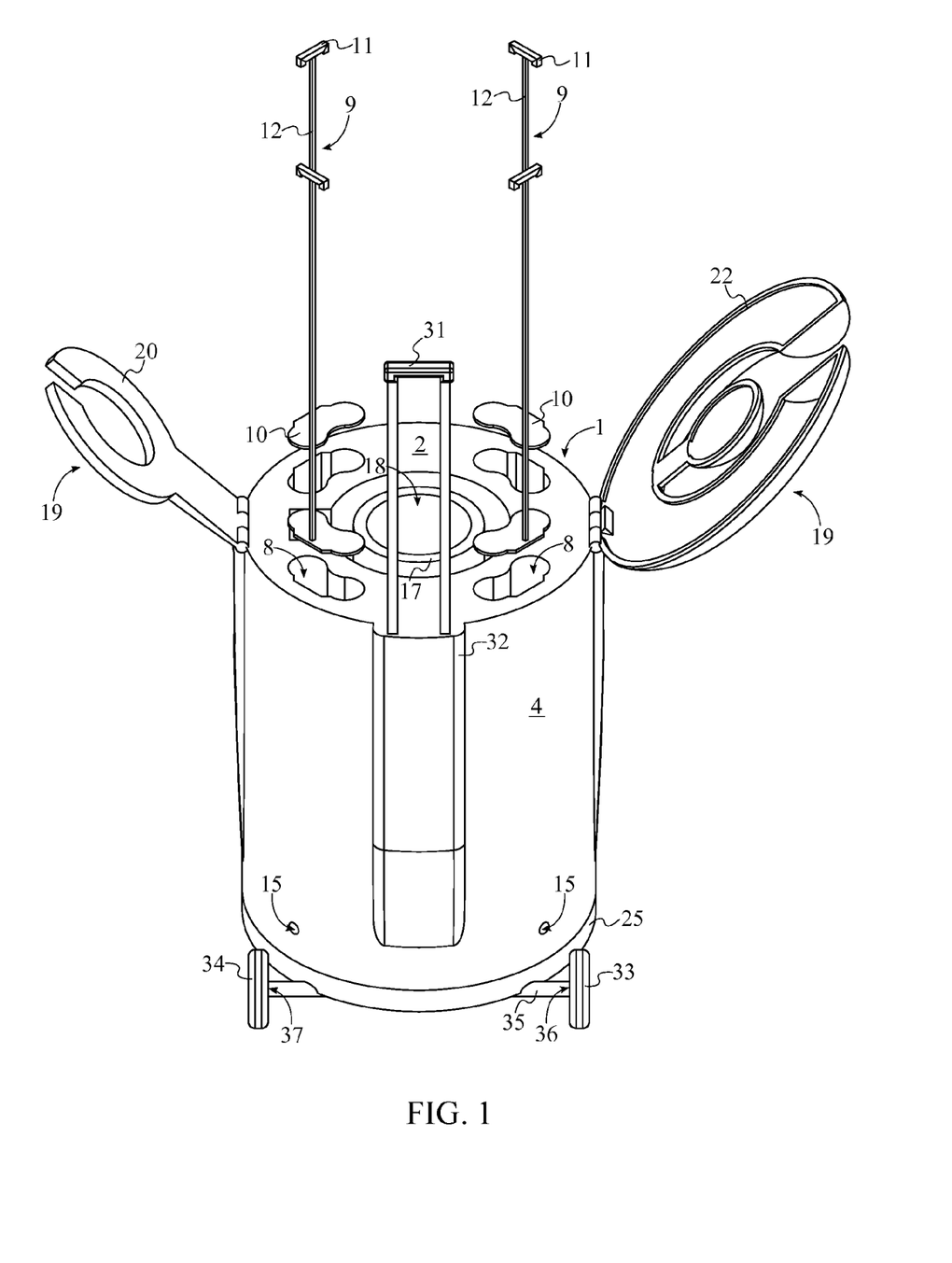
FIG. 1 is an exploded perspective view of the present invention.

The present invention is a portable food and beverage storage and dispensing cooler for storing and cooling liquids and dry items while keeping the liquids and dry items separated. The present invention is shown in FIG. 1 and comprises an insulated tubular body 1, a plurality of beverage slots 8, a plurality of beverage-storage units 9, an annular divider 17, an at least one insulated lid 19, and an insulated floor 25.

With reference to FIGS. 1-5, the insulated tubular body 1 is the main body into which liquids and dry items are placed and is able to insulate the contents from the exterior environment. The insulated tubular body 1 comprises a first base surface 2, a second base surface 3, an outer lateral surface 4, and an inner lateral surface 6. The first base surface 2 and the second base surface 3 are opposing surfaces along the insulated tubular body 1. The insulated floor 25 is connected across the second base surface 3 and prevents contents within the insulated tubular body 1 from falling out. The outer lateral surface 4 is the outward-facing and outermost surface of the insulated tubular body 1 while the inner lateral surface 6 is positioned within the insulated tubular body 1. The at least one insulated lid 19 is able to cover the contents of the insulated tubular body 1. The at least one insulated lid 19 is hingedly connected to the insulated tubular body 1, adjacent to the first base surface 2. This allows the at least one insulated lid 19 to be lifted or lowered as needed to uncover or cover the contents of the insulated tubular body 1.

Figure 2:
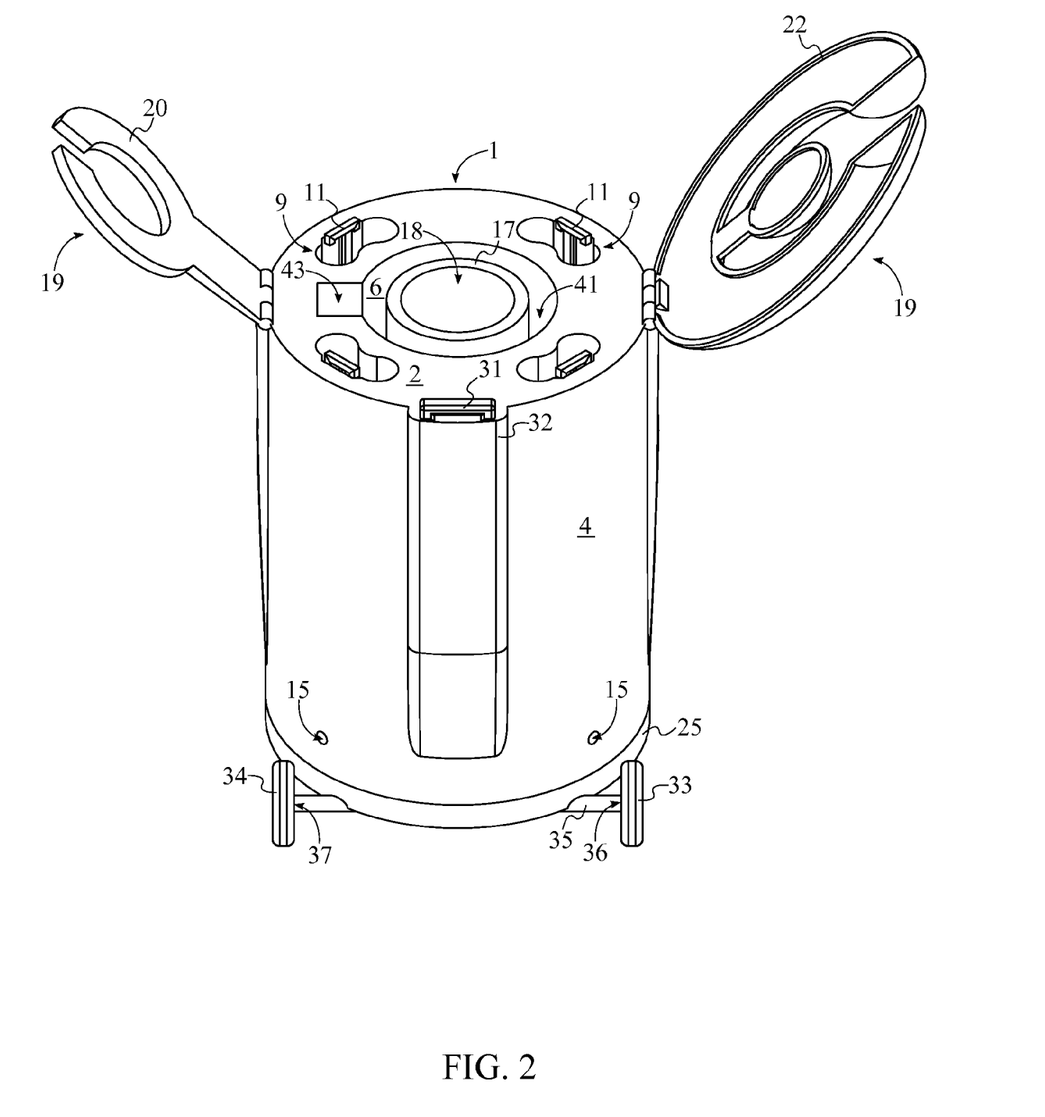
FIG. 2 is a perspective view of the present invention.

The plurality of beverage slots 8 is able to accommodate the plurality of beverage-storage units 9 within the insulated tubular body 1. The plurality of beverage slots 8 traverses into the insulated tubular body 1 from the first base surface 2, allowing the plurality of beverage-storage units 9 to be inserted into the insulated tubular body 1. As can be seen in FIG. 1 and FIG. 2, the plurality of beverage slots 8 is radially distributed about the first base surface 2, providing separation between the plurality of beverage-storage units 9. Each of the plurality of beverage-storage units 9 is mounted into a corresponding slot from the plurality of beverage slots 8, allowing the plurality of beverage-storage units 9 to be stored and insulated within the insulated tubular body 1. The plurality of beverage-storage units 9 is capable of holding various types of beverage containers such as cans and bottles as well as additional loose items.

Figure 5:
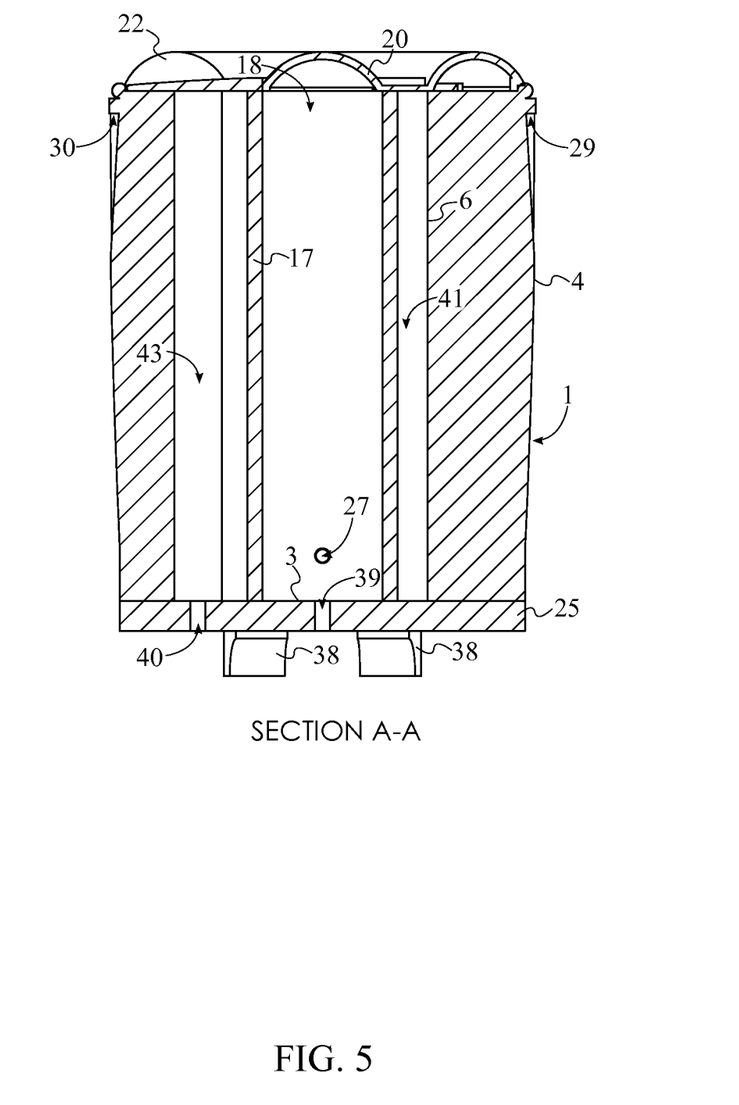
FIG. 5 is a cross-sectional view of the present invention taken along line A-A of FIG. 4.

The annular divider 17 is a tubular wall that forms two individual storage compartments within the insulated tubular body 1. As shown in FIG. 1, FIG. 2, and FIG. 5, the annular divider 17 is concentrically positioned within the insulated tubular body 1. Additionally, the annular divider 17 is radially offset from the inner lateral surface 6. The positioning of the annular divider 17 forms a ring-like compartment in between the inner lateral surface 6 and the annular divider 17 as well as a central cylindrical compartment within the annular divider 17. In the preferred embodiment of the present invention, the ring-like compartment may be filled with ice in order to keep contents within the central cylindrical compartment and the plurality of beverage slots 8 cool.

In the preferred embodiment of the present invention shown in FIGS. 1-9, each of the plurality of beverage-storage units 9 comprises a base platform 10, a handle 11, and an elongated member 12. Beverage containers such as cans and bottles may be placed onto the base platform 10 when the plurality of beverage-storage units 9 is inserted into the plurality of beverage slots 8. Alternatively, additional non-beverage items may be stored on the base platform 10 as well. In the preferred embodiment of the present invention, the base platform 10 is designed in a manner such that beverage containers are stored in two side-by-side columns when the base platform 10 is positioned within the corresponding slot. The base platform 10 is slidably engaged into the corresponding slot, allowing the contents on the base platform 10 to be insulated and cooled within the insulated tubular body 1. The base platform 10 may be easily removed from the corresponding slot to facilitate retrieval of the beverage containers or other contents on the base platform 10. The handle 11 facilitates removal of the base platform 10 from the corresponding slot by improving leverage on the base platform 10 during removal. The base platform 10 is adjacently connected to the elongated member 12 while the handle 11 is adjacently connected to the elongated member 12, opposite to the base platform 10. The elongated member 12 is thus able to offset the handle 11 from the base platform 10 and allows the handle 11 to be used to lift the base platform 10 in order to gain access to the items stored on the base platform 10. This allows the handle 11 to be lifted in order to lift the base platform 10 and items on the base platform 10 as well from within the corresponding slot.

Figure 3:
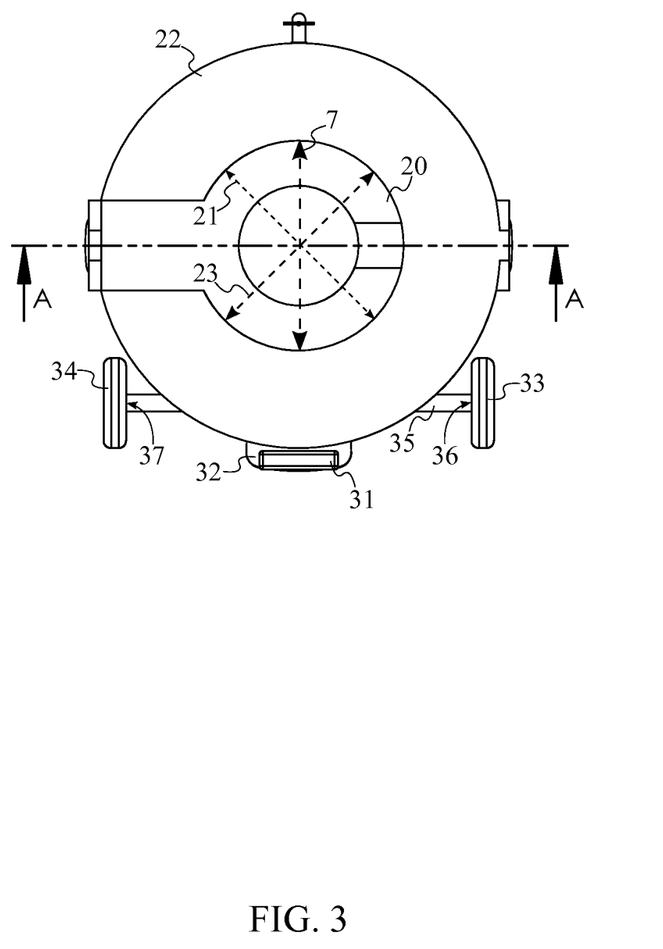
FIG. 3 is a top view of the present invention.
Figure 4:
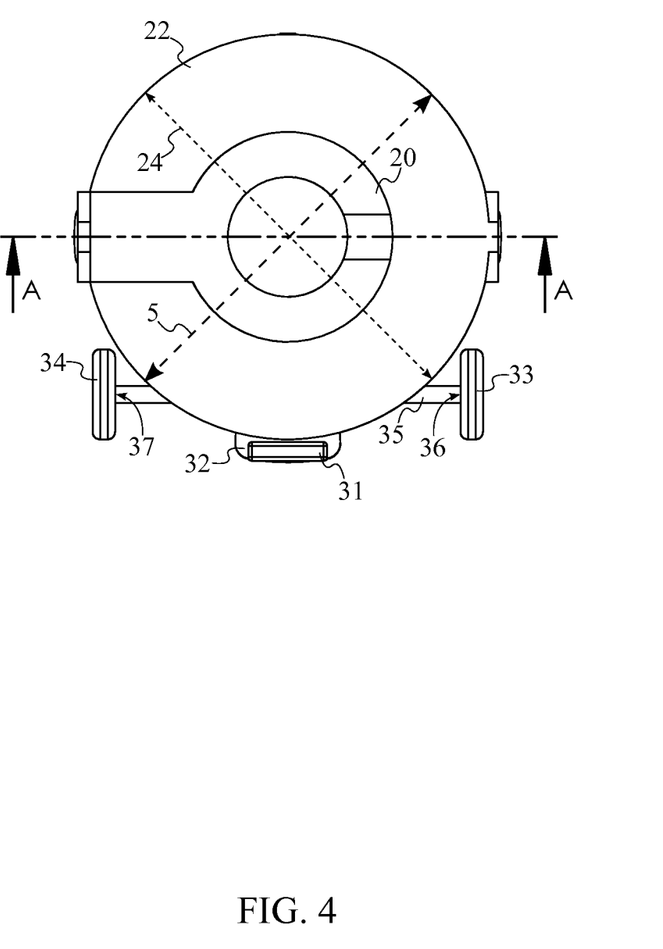
FIG. 4 is an additional top view of the present invention.

The at least one insulated lid 19 comprises an inner C-shaped lid 20 and an outer C-shaped lid 22. The inner C-shaped lid 20 and the outer C-shaped lid 22 are able to cover the contents within the interior portions of the insulated tubular body 1. The inner C-shaped lid 20 is hingedly connected to the insulated tubular body 1, adjacent to the first base surface 2. Similarly, the outer C-shaped lid 22 is hingedly connected to the insulated tubular body 1, adjacent to the first base surface 2 and opposite to the inner C-shaped lid 20. This allows the inner C-shaped lid 20 and the outer C-shaped lid 22 to close inward onto each other. When the inner C-shaped lid 20 and the outer C-shaped lid 22 are closed, the inner C-shaped lid 20 is positioned within the outer C-shaped lid 22 as shown in FIG. 3 and FIG. 4. An outer diameter 21 of the inner C-shaped lid 20 and an inner diameter 23 of the outer C-shaped lid 22 are equivalent to a diameter 7 of the inner lateral surface 6. This ensures that the ring-like compartment in between the inner lateral surface 6 and the annular divider 17 as well as the central cylindrical compartment within the annular divider 17 are both covered by the inner C-shaped lid 20. An outer diameter 24 of the outer C-shaped lid 22 is equivalent to a diameter 5 of the outer lateral surface 4. This ensures that the outer C-shaped lid 22 is able to cover the plurality of beverage slots 8.

Figure 8:
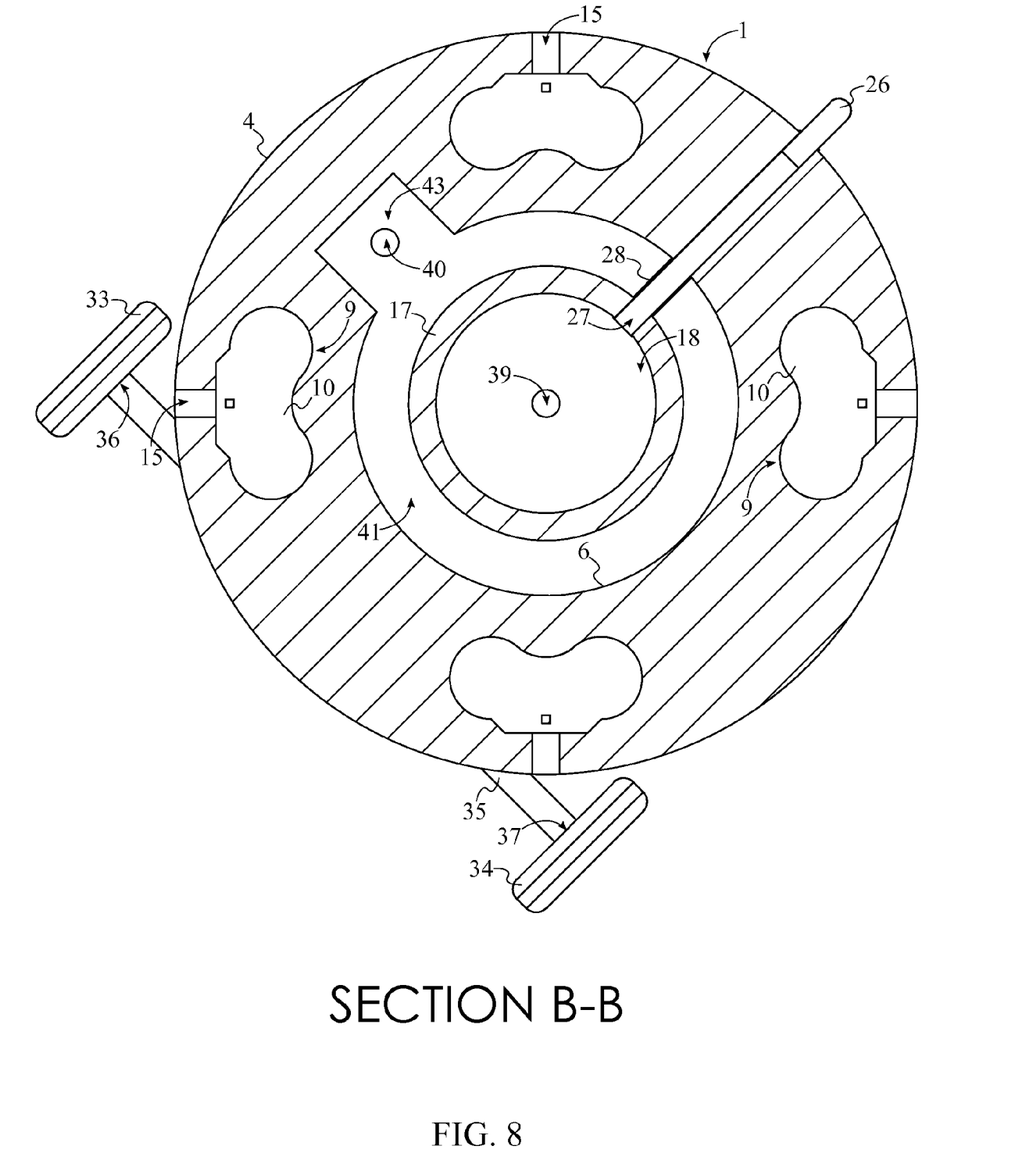
FIG. 8 is a cross-sectional view of the present invention taken along line B-B of FIG. 7.

As shown in FIG. 8, the present invention further comprises a primary spout 26, a housing conduit 27, and a delivery tube 28. The primary spout 26 allows a liquid stored in the central cylindrical compartment within the annular divider 17 to be dispensed. The housing conduit 27 is a hollow channel that provides access to the liquid within the central cylindrical compartment from the exterior of the insulated tubular body 1. The housing conduit 27 traverses through the insulated tubular body 1 from the outer lateral surface 4 to the inner lateral surface 6 and laterally traverses into the annular divider 17. This allows the delivery tube 28 to be inserted from the outer lateral surface 4 to the annular divider 17. The delivery tube 28 is a hollow tube through which the liquid is able to travel. The delivery tube 28 is mounted within the housing conduit 27 to prevent the liquid from spilling into the ring-like compartment within the insulated tubular body 1. The primary spout 26 is mounted into the housing conduit 27 and is externally positioned to the outer lateral surface 4 to improve accessibility to the primary spout 26. A lumen 18 of the annular divider 17 is in fluid communication with the primary spout 26 through the delivery tube 28. As such, liquid within the central cylindrical compartment may be dispensed directly from the primary spout 26 on the exterior of the insulated tubular body 1 after traveling through the delivery tube 28.

Figure 6:
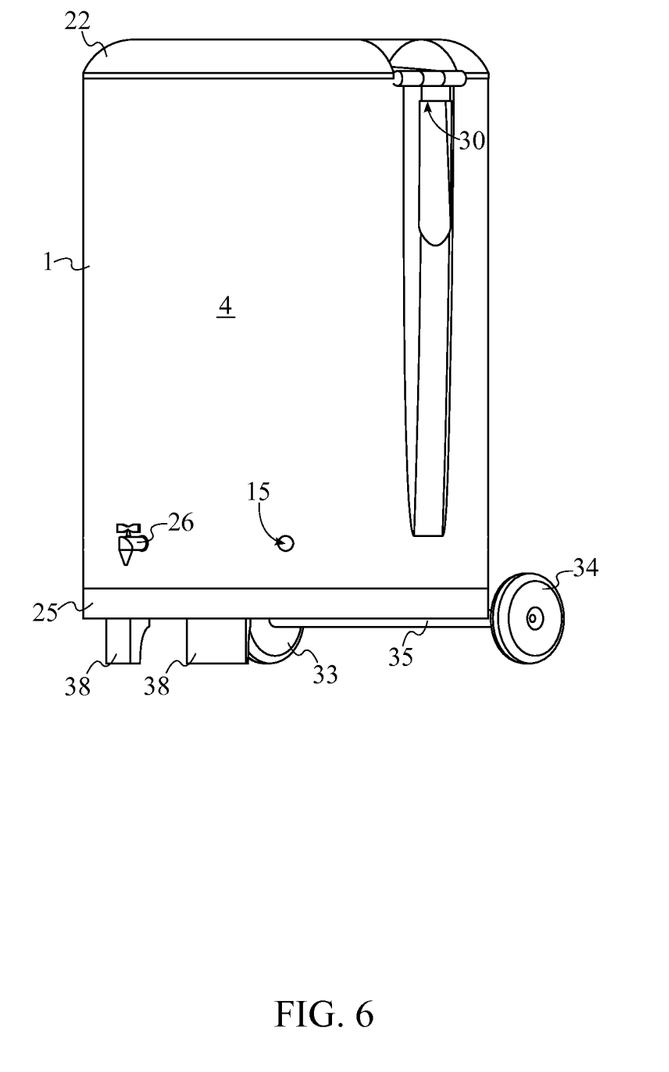
FIG. 6 is a right side view of the present invention.
Figure 7:
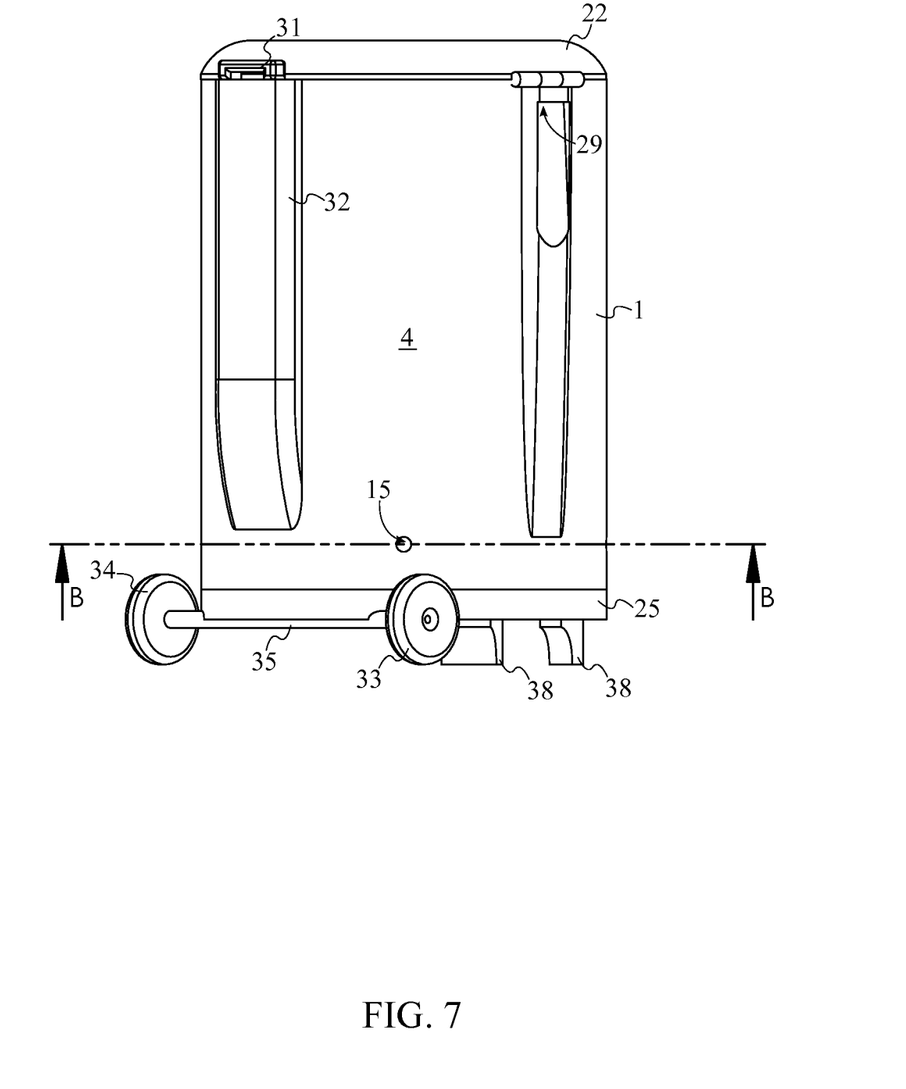
FIG. 7 is a left side view of the present invention.

With reference to FIG. 6 and FIG. 7, the present invention further comprises a first handhold 29 and a second handhold 30. The first handhold 29 and the second handhold 30 allow the present invention to be easily lifted and transported. The first handhold 29 traverses into the outer lateral surface 4, adjacent to the first base surface 2. The second handhold 30 also traverses into the outer lateral surface 4, adjacent to the first base surface 2. The first handhold 29 and the second handhold 30 thus serve as recessed ridges that may be easily grasped by the hands. The first handhold 29 and the second handhold 30 are positioned opposite to each other about the outer lateral surface 4. This positioning allows the present invention to be better supported when being lifted by the first handhold 29 and the second handhold 30.

Again with reference to FIG. 1, the present invention further comprises a pull handle 31 and a pull handle housing sleeve 32. The pull handle 31 allows the present invention to be drawn along a surface when transporting the present invention and provides an alternative to carrying the present invention. The pull handle housing sleeve 32 protects the pull handle 31 when the pull handle 31 is not in use as shown in FIG. 2. The pull handle housing sleeve 32 is connected to the outer lateral surface 4, adjacent to the first base surface 2. This allows the pull handle 31 to extend from the first base surface 2 when in use and be contained within the pull handle housing sleeve 32 adjacent to the outer lateral surface 4 when not in use. The pull handle 31 is telescopically engaged into the pull handle housing sleeve 32, allowing the pull handle 31 to be extended from or retracted into the pull handle housing sleeve 32 as needed.

In order to allow the present invention to be drawn along a surface, the present invention further comprises a left wheel 33, a right wheel 34, and an axle 35. The axle 35 is able to rotate when the left wheel 33 and the right wheel 34 are placed into contact with a surface and moved along the surface, allowing the present invention to roll on the surface when pulled by the pull handle 31. The pull handle 31 is first utilized to tilt the present invention and then to pull the present invention along the surface. As shown in FIGS. 5-7 and FIG. 9, the present invention further comprises an at least one stabilizing foot 38 that provides a stable base for the present invention when the present invention is stationary and resting on a surface. The axle 35 is rotatably mounted to the insulated floor 25 to allow the left wheel 33 and the right wheel 34 to rotate together when the present invention is rolling along a surface. The left wheel 33 is mounted to a first end 36 of the axle 35 while the right wheel 34 is mounted to a second end 37 of the axle 35. As such, the left wheel 33 and right wheel 34 are positioned opposite to each other across the axle 35, providing stability to the present invention when the present invention is rolling across a surface. The at least one stabilizing foot 38 is adjacently mounted to the insulated floor 25 and is thus able to protrude from the insulated floor 25. The at least one stabilizing foot 38 is positioned opposite to the axle 35 across the insulated floor 25. Because the axle 35, the left wheel 33, and the right wheel 34 protrude from the insulated floor 25, the at least one stabilizing foot 38 is able to provide a stable base for the present invention and prevent the present invention from tipping over.

Figure 9:
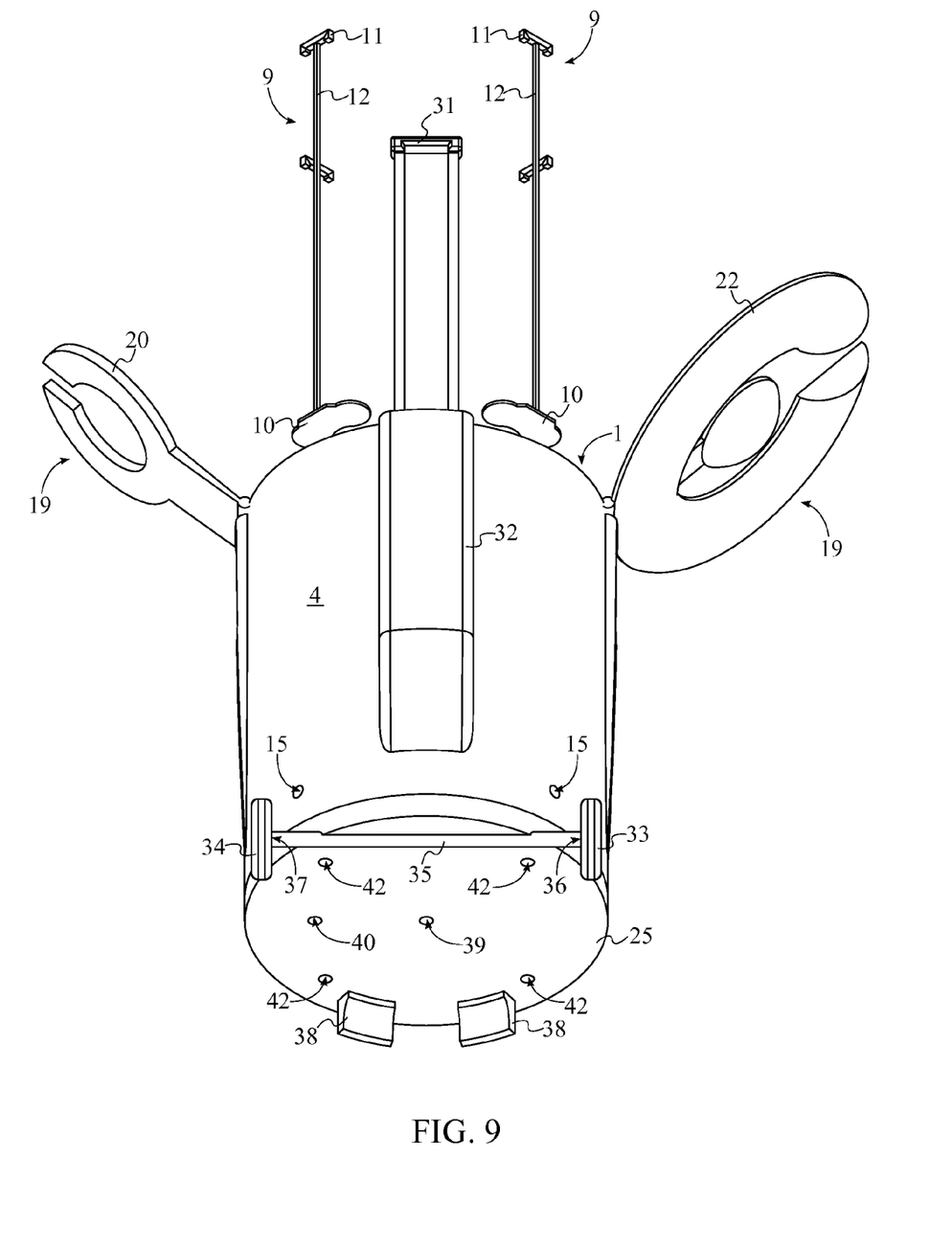
FIG. 9 is an exploded perspective view of the present invention.
Figure 10:
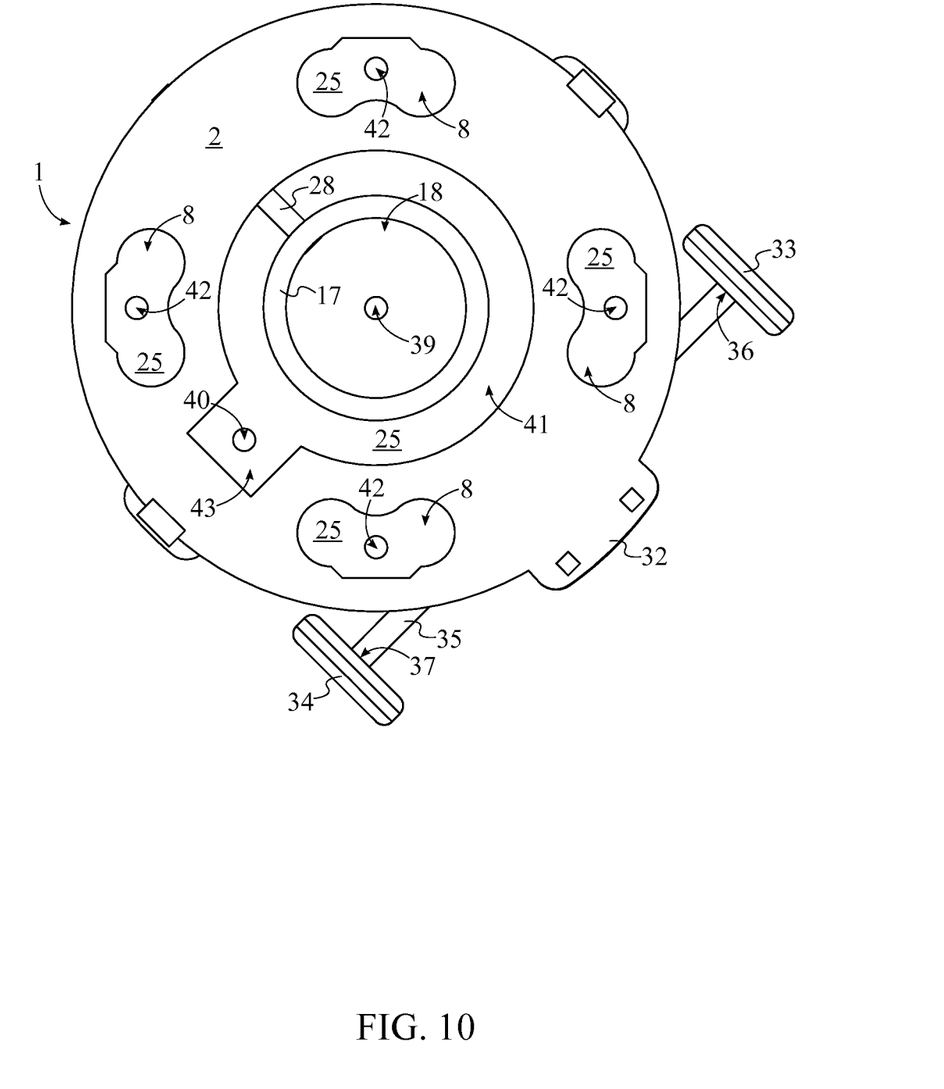
FIG. 10 is a top view of the present invention showing the positioning of the plurality of secondary drains.

With further reference to FIG. 5 and FIG. 9, the present invention further comprises a first primary drain 39 and a second primary drain 40. The first primary drain 39 and the second primary drain 40 allow condensation and additional liquids to be drained from the insulated tubular body 1. The first primary drain 39 traverses through the insulated floor 25 and into the lumen 18 of the annular divider 17. As such, the central cylindrical compartment may be drained via the first primary drain 39. The second primary drain 40 traverses through the insulated floor 25 and into a lateral space 41 about the annular divider 17. The lateral space 41 corresponds to the ring-like compartment in between the inner lateral surface 6 and the annular divider 17. The lateral space 41 may thus be drained via the second primary drain 40. The present invention further comprises a plurality of secondary drains 42. The plurality of secondary drains 42 functions similarly to the first primary drain 39 and the second primary drain 40, allowing condensation and additional liquids to be drained from the insulated tubular body 1. The plurality of secondary drains 42 traverses through the insulated floor 25 and into a corresponding slot from the plurality of beverage slots 8 as shown in FIG. 10. As such, the plurality of beverage slots 8 may be drained via the plurality of secondary drains 42. The first primary drain 39, the second primary drain 40, and the plurality of secondary drains 42 may be temporarily sealed or blocked to prevent leakage from the present invention.

The present invention further comprises an at least one recessed space 43 as shown in FIG. 1, FIG. 2, FIG. 5, and FIG. 8. The at least one recessed space 43 provides additional space for ice within the insulated tubular body 1. The at least one recessed space 43 traverses into the insulated tubular body 1 from the inner lateral surface 6. The at least one recessed space 43 thus provides additional space for ice in addition to the lateral space 41 about the annular divider 17. The at least one recessed space 43 is positioned in between the plurality of beverage slots 8, providing greater cooling capability for the plurality of beverage-storage units 9 within the plurality of beverage slots 8.

Figure 11:
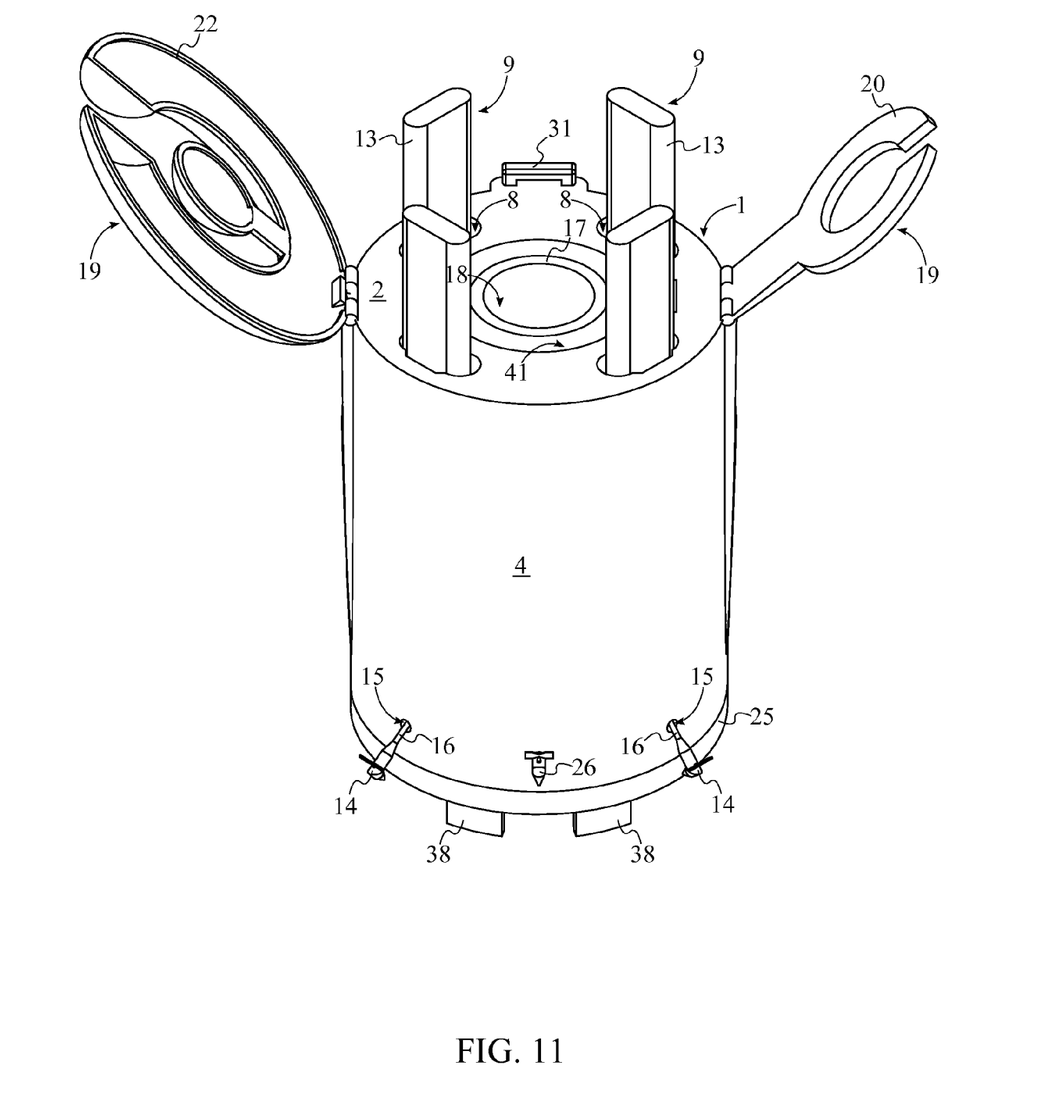
FIG. 11 is an exploded perspective view of the present invention, wherein each of the plurality of beverage-storage units includes a bladder.

In the preferred embodiment of the present invention shown in FIG. 11, each of the plurality of beverage-storage units 9 further comprises a bladder 13, a secondary spout 14, an access port 15, and a snaking tube 16. The bladder 13 may be filled with liquid and the bladder 13 is situated within the corresponding slot from the plurality of beverage slots 8. This allows multiple types of liquids to be stored within the plurality of beverage slots 8. Liquid within the bladder 13 is able to travel through the snaking tube 16 to the secondary spout 14 before being dispensed from the secondary spout 14. The access port 15 allows the snaking tube 16 and the secondary spout 14 to extend to the exterior of the insulated tubular body 1 from within the plurality of beverage slots 8. The access port 15 traverses through the insulated tubular body 1 and into the corresponding slot, providing accessibility to the liquid within the bladder 13 from the exterior of the insulated tubular body 1. The bladder 13 is in fluid communication with the secondary spout 14 through the snaking tube 16. This enables liquid from the bladder 13 to be dispensed from the secondary spout 14 after traveling through the snaking tube 16. The snaking tube 16 traverses out of the corresponding slot and through the access port 15. Additionally, the secondary spout 14 is externally positioned to the outer lateral surface 4. As such, liquid from the bladder 13 is dispensed from the secondary spout 14 and is easily accessible from the exterior of the insulated tubular body 1.

Although the present invention has been explained in relation to its preferred embodiment, it is understood that many other possible modifications and variations can be made without departing from the spirit and scope of the present invention as hereinafter claimed.

What is claimed is:

1. A portable food and beverage storage and dispensing cooler comprises:
    an insulated tubular body;
    a plurality of beverage slots;
    a plurality of beverage-storage units;
    an annular divider;
    an at least one insulated lid;
    an insulated floor;
    the insulated tubular body comprises a first base surface, a second base surface, an outer lateral surface, and an inner lateral surface;
    the plurality of beverage slots being radially distributed about the first base surface;
    the plurality of beverage slots traversing into the insulated tubular body from the first base surface;
    each of the plurality of beverage-storage units being mounted into a corresponding slot from the plurality of beverage slots;
    the annular divider being concentrically positioned within the insulated tubular body;
    the annular divider being radially offset from the inner lateral surface;
    the at least one insulated lid being hingedly connected to the insulated tubular body, adjacent to the first base surface;
    the insulated floor being connected across the second base surface;
    a first primary drain;
    a second primary drain;
    the first primary drain traversing through the insulated floor and into a lumen of the annular divider; and
    the second primary drain traversing through the insulated floor and into a lateral space about the annular divider.

2. The portable food and beverage storage and dispensing cooler as claimed in claim 1 further comprises:
    each of the plurality of beverage-storage units comprises a base platform, a handle, and an elongated member;
    the base platform being slidably engaged into the corresponding slot;
    the base platform being adjacently connected to the elongated member; and
    the handle being adjacently connected to the elongated member, opposite to the base platform.

3. The portable food and beverage storage and dispensing cooler as claimed in claim 1 further comprises:
    the at least one insulated lid comprises an inner C-shaped lid and an outer C-shaped lid;
    the inner C-shaped lid being hingedly connected to the insulated tubular body, adjacent to the first base surface;
    the outer C-shaped lid being hingedly connected to the insulated tubular body, adjacent to the first base surface and opposite to the inner C-shaped lid;
    an outer diameter of the inner C-shaped lid and an inner diameter of the outer C-shaped lid being equivalent to a diameter of the inner lateral surface; and
    an outer diameter of the outer C-shaped lid being equivalent to a diameter of the outer lateral surface.

4. The portable food and beverage storage and dispensing cooler as claimed in claim 1 further comprises:
    a primary spout;
    a housing conduit;
    a delivery tube;
    the housing conduit traversing through the insulated tubular body from the outer lateral surface to the inner lateral surface;

the housing conduit laterally traversing into the annular divider;
the primary spout being mounted into the housing conduit;
the primary spout being externally positioned to the outer lateral surface;
the delivery tube being mounted within the housing conduit; and
a lumen of the annular divider being in fluid communication with the primary spout through the delivery tube.

5. The portable food and beverage storage and dispensing cooler as claimed in claim 1 further comprises:
a first handhold;
a second handhold;
the first handhold traversing into the outer lateral surface, adjacent to the first base surface;
the second handhold traversing into the outer lateral surface, adjacent to the first base surface; and
the first handhold and the second handhold being positioned opposite to each other about the outer lateral surface.

6. The portable food and beverage storage and dispensing cooler as claimed in claim 1 further comprises:
a pull handle;
a pull handle housing sleeve;
the pull handle housing sleeve being connected to the outer lateral surface, adjacent to the first base surface; and
the pull handle being telescopically engaged into the pull handle housing sleeve.

7. The portable food and beverage storage and dispensing cooler as claimed in claim 1 further comprises:
a left wheel;
a right wheel;
an axle;
an at least one stabilizing foot;
the axle being rotatably mounted to the insulated floor;
the left wheel being mounted to a first end of the axle;
the right wheel being mounted to a second end of the axle;
the at least one stabilizing foot being adjacently mounted to the insulated floor; and
the at least one stabilizing foot being positioned opposite to the axle across the insulated floor.

8. The portable food and beverage storage and dispensing cooler as claimed in claim 1 further comprises:
an at least one recessed space;
the at least one recessed space traversing into the insulated tubular body from the inner lateral surface; and
the at least one recessed space being positioned in between the plurality of beverage slots.

9. The portable food and beverage storage and dispensing cooler as claimed in claim 1 further comprises:
each of the plurality of beverage-storage units further comprises a bladder, a secondary spout, an access port, and a snaking tube;
the access port traversing through the insulated tubular body and into the corresponding slot;
the bladder being situated within the corresponding slot;
the bladder being in fluid communication with the secondary spout through the snaking tube;
the snaking tube traversing out of the corresponding slot and through the access port; and
the secondary spout being externally positioned to the outer lateral surface.

10. A portable food and beverage storage and dispensing cooler comprises:
an insulated tubular body;
a plurality of beverage slots;
a plurality of beverage-storage units;
an annular divider;
an at least one insulated lid;
an insulated floor;
a primary spout;
a housing conduit;
a delivery tube;
the insulated tubular body comprises a first base surface, a second base surface, an outer lateral surface, and an inner lateral surface;
the at least one insulated lid comprises an inner C-shaped lid and an outer C-shaped lid;
the plurality of beverage slots being radially distributed about the first base surface;
the plurality of beverage slots traversing into the insulated tubular body from the first base surface;
each of the plurality of beverage-storage units being mounted into a corresponding slot from the plurality of beverage slots;
the annular divider being concentrically positioned within the insulated tubular body;
the annular divider being radially offset from the inner lateral surface;
the at least one insulated lid being hingedly connected to the insulated tubular body, adjacent to the first base surface;
the insulated floor being connected across the second base surface;
the housing conduit traversing through the insulated tubular body from the outer lateral surface to the inner lateral surface;
the housing conduit laterally traversing into the annular divider;
the primary spout being mounted into the housing conduit;
the primary spout being externally positioned to the outer lateral surface;
the delivery tube being mounted within the housing conduit;
a lumen of the annular divider being in fluid communication with the primary spout through the delivery tube;
the inner C-shaped lid being hingedly connected to the insulated tubular body, adjacent to the first base surface;
the outer C-shaped lid being hingedly connected to the insulated tubular body, adjacent to the first base surface and opposite to the inner C-shaped lid;
an outer diameter of the inner C-shaped lid and an inner diameter of the outer C-shaped lid being equivalent to a diameter of the inner lateral surface; and
an outer diameter of the outer C-shaped lid being equivalent to a diameter of the outer lateral surface.

11. The portable food and beverage storage and dispensing cooler as claimed in claim 10 further comprises:
each of the plurality of beverage-storage units comprises a base platform, a handle, and an elongated member;
the base platform being slidably engaged into the corresponding slot;
the base platform being adjacently connected to the elongated member; and
the handle being adjacently connected to the elongated member, opposite to the base platform.

12. The portable food and beverage storage and dispensing cooler as claimed in claim 10 further comprises:
a first handhold;
a second handhold;
the first handhold traversing into the outer lateral surface, adjacent to the first base surface;
the second handhold traversing into the outer lateral surface, adjacent to the first base surface; and the first handhold and the second handhold being positioned opposite to each other about the outer lateral surface.

13. The portable food and beverage storage and dispensing cooler as claimed in claim 10 further comprises:
   a pull handle;
   a pull handle housing sleeve;
   the pull handle housing sleeve being connected to the outer lateral surface, adjacent to the first base surface; and
   the pull handle being telescopically engaged into the pull handle housing sleeve.

14. The portable food and beverage storage and dispensing cooler as claimed in claim 10 further comprises:
   a left wheel;
   a right wheel;
   an axle;
   an at least one stabilizing foot;
   the axle being rotatably mounted to the insulated floor;
   the left wheel being mounted to a first end of the axle;
   the right wheel being mounted to a second end of the axle;
   the at least one stabilizing foot being adjacently mounted to the insulated floor; and
   the at least one stabilizing foot being positioned opposite to the axle across the insulated floor.

15. The portable food and beverage storage and dispensing cooler as claimed in claim 10 further comprises:
   a first primary drain;
   a second primary drain;
   the first primary drain traversing through the insulated floor and into a lumen of the annular divider; and
   the second primary drain traversing through the insulated floor and into a lateral space about the annular divider.

16. The portable food and beverage storage and dispensing cooler as claimed in claim 10 further comprises:
   an at least one recessed space;
   the at least one recessed space traversing into the insulated tubular body from the inner lateral surface; and
   the at least one recessed space being positioned in between the plurality of beverage slots.

17. The portable food and beverage storage and dispensing cooler as claimed in claim 10 further comprises:
   each of the plurality of beverage-storage units further comprises a bladder, a secondary spout, an access port, and a snaking tube;
   the access port traversing through the insulated tubular body and into the corresponding slot;
   the bladder being situated within the corresponding slot;
   the bladder being in fluid communication with the secondary spout through the snaking tube;
   the snaking tube traversing out of the corresponding slot and through the access port; and
   the secondary spout being externally positioned to the outer lateral surface.

* * * * *